United States Patent
James

(10) Patent No.: US 8,967,571 B2
(45) Date of Patent: Mar. 3, 2015

(54) PLATE HAVING A BACK SIDE ADAPTED TO BE SECURED TO A BASE AND A FRONT SIDE ADAPTED FOR ATTACHING VARIOUS ITEMS

(71) Applicant: Chun-Nam Chan James, Richmond (CA)

(72) Inventor: Chun-Nam Chan James, Richmond (CA)

(73) Assignee: Primex, Inc., Langley, BC (CA)

( * ) Notice: Subject to any disclaimer, the term of this patent is extended or adjusted under 35 U.S.C. 154(b) by 0 days.

(21) Appl. No.: 13/694,482

(22) Filed: Dec. 6, 2012

(65) Prior Publication Data

US 2014/0158847 A1 Jun. 12, 2014

(51) Int. Cl.
*A47F 5/00* (2006.01)
*F16M 13/02* (2006.01)

(52) U.S. Cl.
CPC .................................... *F16M 13/02* (2013.01)
USPC ............ 248/310; 248/68.1; 248/73; 248/74.3

(58) Field of Classification Search
CPC ............. F16L 3/26; F16L 3/22; H02G 3/0456
USPC .......... 248/310, 68.1, 73, 74.3; 211/134, 184; 439/595
See application file for complete search history.

(56) References Cited

U.S. PATENT DOCUMENTS

| 3,347,505 | A | * | 10/1967 | Menser ........................ 248/68.1 |
| 3,632,071 | A | * | 1/1972 | Cameron et al. ............. 248/74.3 |
| 3,944,176 | A | * | 3/1976 | Danko ......................... 248/68.1 |
| 5,588,728 | A | * | 12/1996 | Eldridge et al. ........... 312/332.1 |
| 5,673,171 | A | * | 9/1997 | Varghese et al. ......... 361/679.34 |
| 2002/0185579 | A1 | * | 12/2002 | Henning .................. 248/346.02 |
| 2007/0257159 | A1 | * | 11/2007 | Nelson et al. ................... 248/73 |
| 2010/0193450 | A1 | * | 8/2010 | Bayazit et al. .................. 211/26 |
| 2011/0211329 | A1 | * | 9/2011 | Dean et al. .................... 361/826 |
| 2012/0282800 | A1 | | 11/2012 | Beck, Jr. et al. |

FOREIGN PATENT DOCUMENTS

EP 2365596 A2 * 9/2011
WO WO 2005106304 A1 * 11/2005

* cited by examiner

*Primary Examiner* — Monica Millner
(74) *Attorney, Agent, or Firm* — Frederick Kaufman Inc.

(57) ABSTRACT

A flat plastic structure is provided with several horizontal, parallel rows of openings, each comprising several single, for horizontally attaching openings, alternating with several double, for vertically attaching openings. Each of the several single, for horizontally attaching openings has an upper and a lower wall converging inwardly from horizontal edges of those several openings. A flat bar for horizontally attaching centrally connects opposite vertical walls of each single opening. A double, for vertically attaching opening incorporates a vertically extending, centrally located apex-shape structure formed by a pair of intersecting walls diverging towards the back side. A flat bar for vertically attaching is located at each side of the vertically extending centrally located apex-shape structure connects opposite vertical walls of the double, vertically attaching opening.

2 Claims, 4 Drawing Sheets

Figure 1:
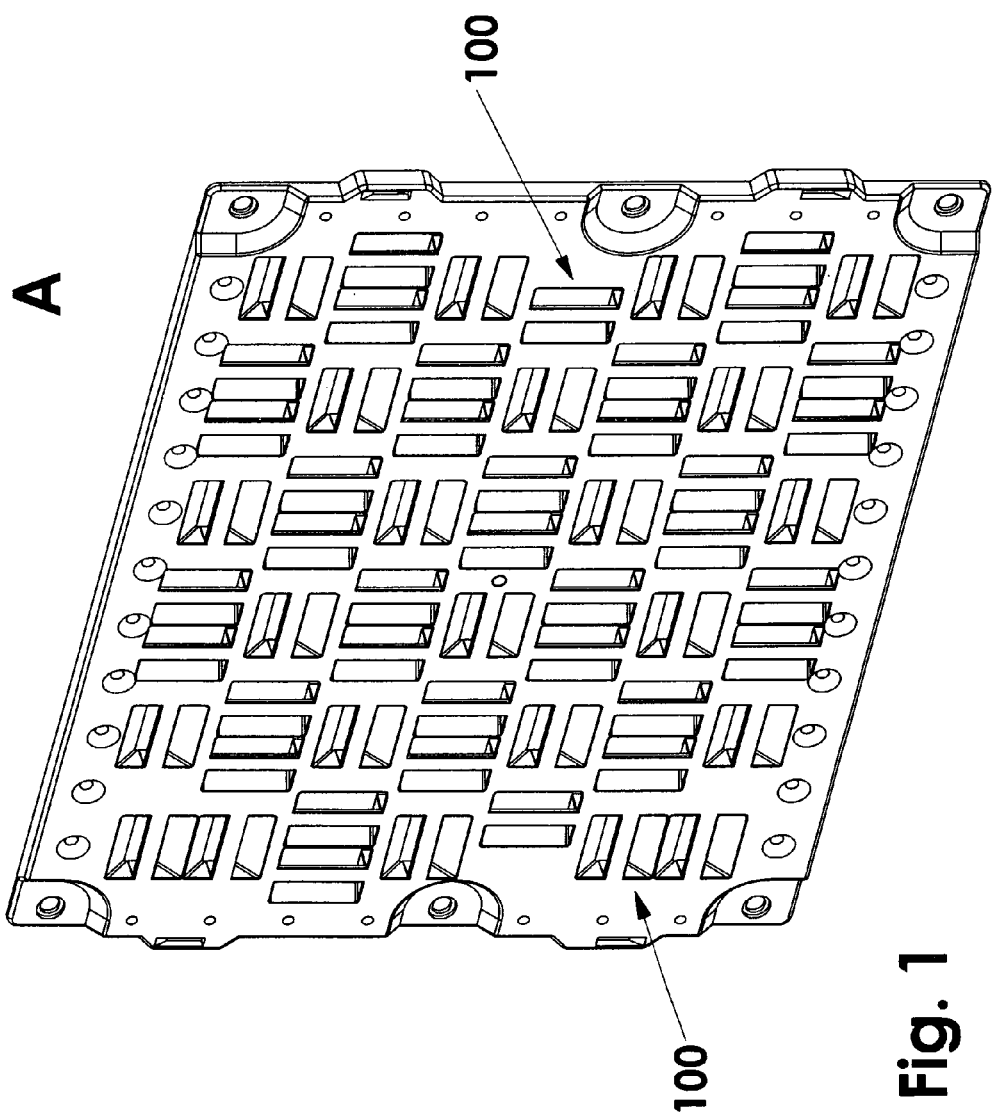

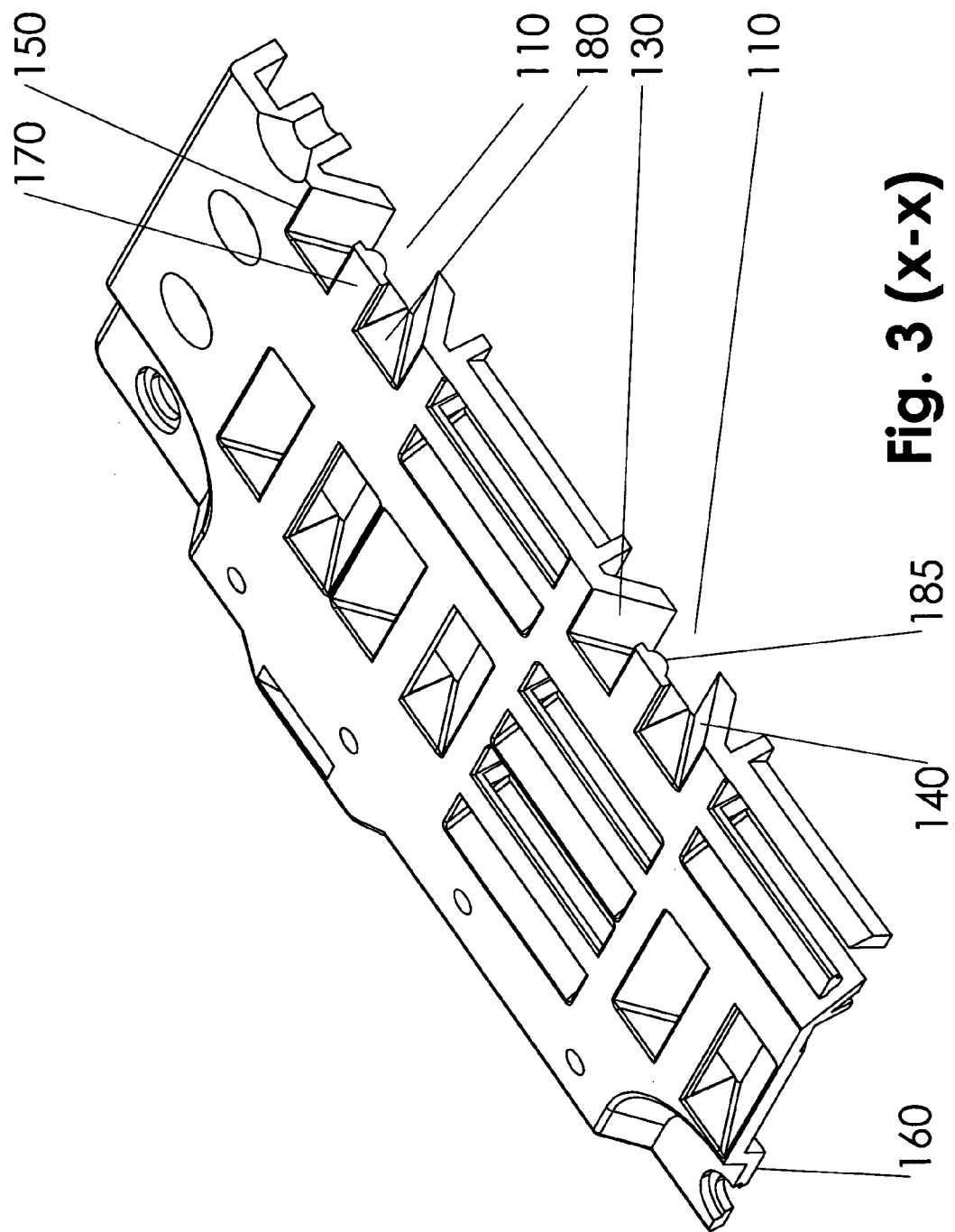
Fig. 3 (x-x)

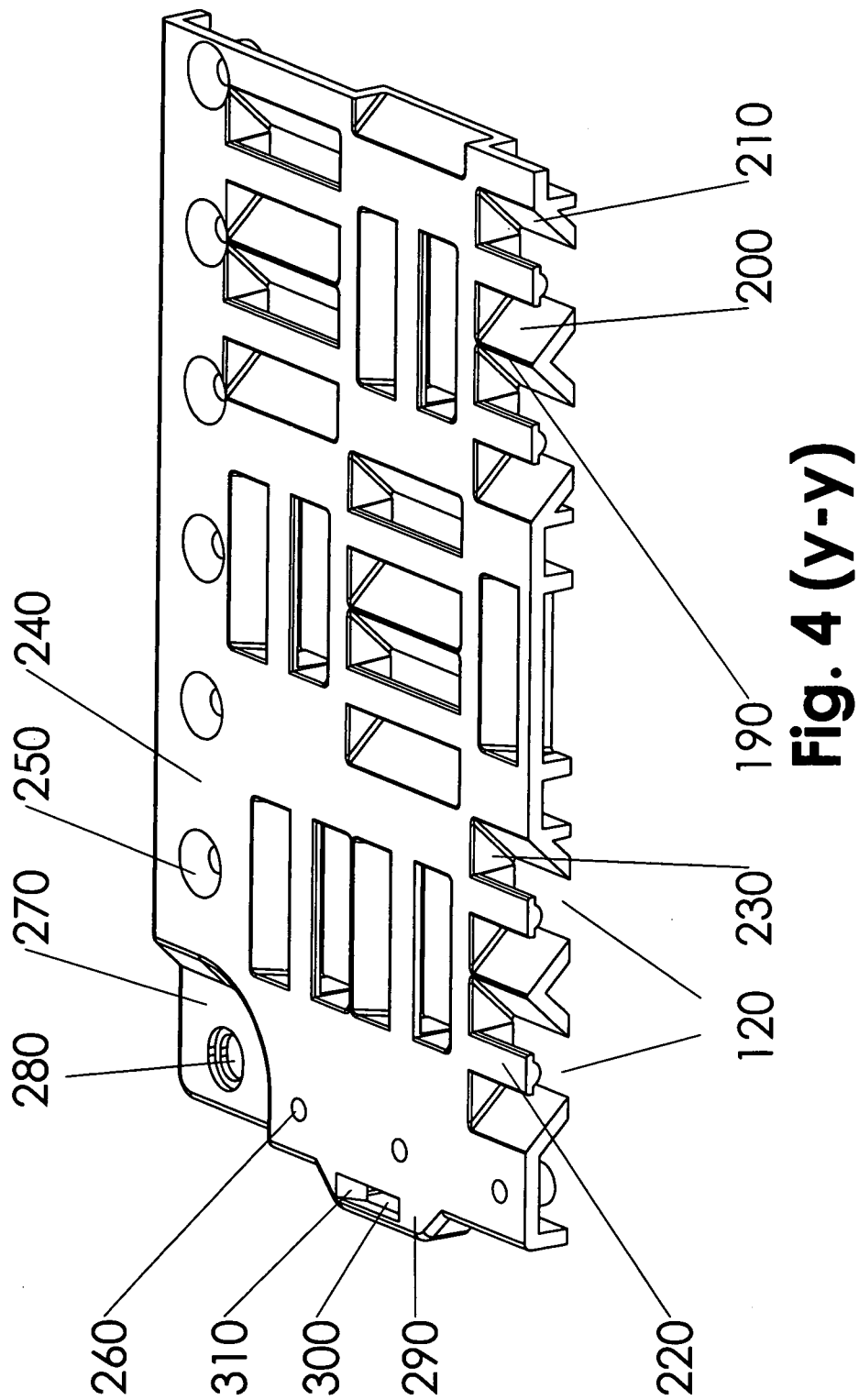
Fig. 4 (y-y)

PLATE HAVING A BACK SIDE ADAPTED TO BE SECURED TO A BASE AND A FRONT SIDE ADAPTED FOR ATTACHING VARIOUS ITEMS

I. BACKGROUND OF THE INVENTION

1. Definition of the Invention

The present invention relates, in general, to mounting plates, and, in particular, to a plate having a back side adapted to be secured to a base and a front side adapted for attaching various items

2. Description of the Prior Art

An attempt had been made by Suttle Corporate (1001 East Highway 212 Hector, Minn. 55342), which developed a mounting plate attachable to a base, to which plate various items could be secured. The mounting plate is stamped out of a metal sheet and has an upper surface with cut-out slots and parallel indented zones provided with holes for attaching to a base.

The disadvantages of this mounting plate reside in the fact that the versatility of the plate is highly reduced due to the use of only vertical bars for items attachment and the difficulty of guiding ties or tapes during the insertion under the vertical bars, especially when the plate is already attached to a base.

II. SUMMARY OF THE INVENTION

Based on the above description, one can conclude that there is a need for an improved mounting plate.

Thus, a first objective of the present invention is to develop a plate structure, made from a plastic material, to prevent interferences with electronic signals.

A second objective of the present invention is to develop a plate adaptable to be attached to different types of bases and to which items of different shapes and sizes can be attached in different positions.

A third objective of the present invention is to provide a plate which, without detaching it from the base, various items could be easily attached or removed; and finally A fourth objective of the present invention is to device a plate which is ergonomically friendly and has an esthetically appealing appearance.

Broadly stating, according to the present invention a plate having a back side adapted to be secured to a base and a front side adapted for attaching various items, incorporates:

a flat, plastic molded structure provided with several horizontal, parallel rows of openings, each one of the several horizontal, parallel rows of openings comprising several single, for horizontally attaching openings, alternating with several double, for vertically attaching openings;

each of the several single, for horizontally attaching openings has an upper and a lower wall, the upper and lower walls inwardly converging from horizontal edges of each of the several single, for horizontally attaching opening, towards a back side of the flat, plastic molded, rectangular structure;

a flat bar for horizontally attaching, centrally connecting opposite vertical walls of each single, for horizontally attaching opening, the bar for horizontally attaching extending underneath into a rounded protuberance;

a double, for vertically attaching opening incorporating a vertically extending, centrally located apex-shape structure formed by a pair of intersecting walls diverging towards the back side; the double, for vertically attaching opening being horizontally limited by a pair of inwardly converging walls; and a flat bar for vertically attaching, similar to the flat bar for horizontally attaching, being located at each side of the vertically extending, centrally located apex-shape structure, connects opposite vertical walls of the double, for vertically attaching opening.

In one aspect of the present invention, the plate having a back side adapted to be secured to a base and a front side, adapted for attaching various items, incorporates:

a flat, plastic molded structure provided with several horizontal, parallel rows of openings, each one of the several horizontal, parallel rows of openings comprising several single, for horizontally attaching openings, alternating with several double, for vertically attaching openings;

each of the several single, for horizontally attaching openings has an upper and a lower wall, the upper and lower walls inwardly converging from horizontal edges of each of the several single, for horizontally attaching opening, towards a back side of the flat, plastic molded, rectangular structure;

a flat bar for horizontally attaching, centrally connecting opposite vertical walls of each single, for horizontally attaching opening, the bar for horizontally attaching extending underneath into a rounded protuberance;

a double, for vertically attaching opening incorporating a vertically extending, centrally located apex-shape structure formed by a pair of intersecting walls diverging towards the back side; the double, for vertically attaching opening being horizontally limited by a pair of inwardly converging walls;

a flat bar for vertically attaching, similar to the flat bar for horizontally attaching, being located at each side of the vertically extending centrally located apex-shape structure connects opposite vertical walls of the double, for vertically attaching opening;

said flat, plastic molded structure includes:

top and bottom elongated zones provided with a plurality of equally spaced beveled openings;

laterally, a plurality of through-out openings;

several indented zones provided with several through-out holes;

outwardly extending projections, each including a slot with an inclined wall inwardly and centrally directed;

the flat bar for horizontally attaching being adaptable to interact with a long, thin, bendable element inserted from outside around the flat bar for horizontally attaching and, then, tying around one of the various items;

at least one flat bar for vertically attaching being adaptable to interact with a long, thin, flexible element inserted correspondingly around at least one said flat bars for vertically attaching and, then, tying around one of the items;

the equally spaced beveled openings are adaptable to be used with corresponding countersunk screws inserted through for attaching the flat, plastic molded structure to a base;

the plurality of through-out openings are adaptable to receive screws for attaching the various items to the flat, plastic molded structure;

the several through-out holes located in the indented zones are adaptable to receive push pins for attaching the flat, plastic molded structure to a base; and the slots are adaptable to connect a cover when the latter is used in combination with the flat, plastic molded structure.

III. BRIEF DESCRIPTION OF THE DRAWINGS

Figure 2:
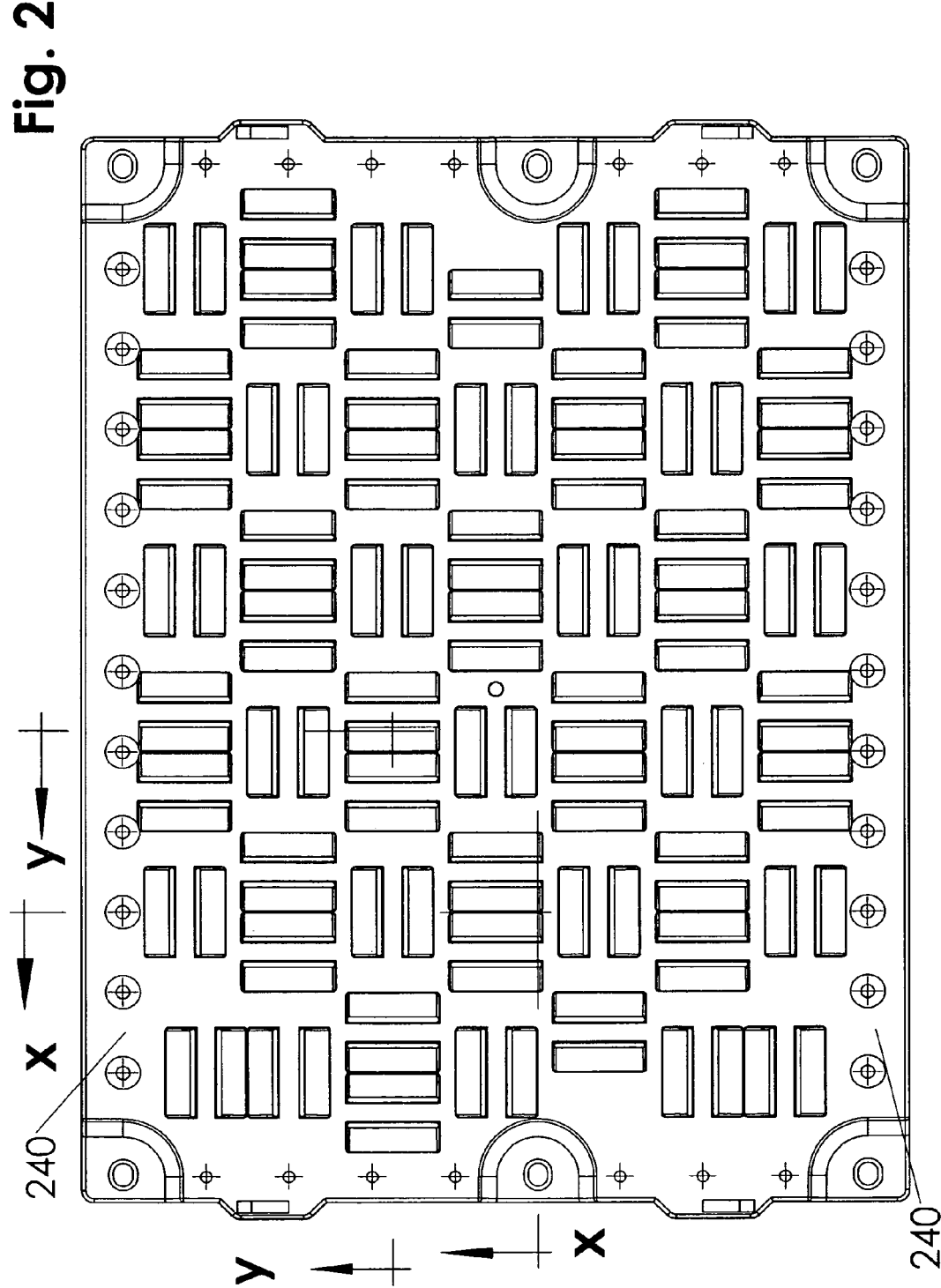

The subject matter of the invention is particularly pointed out and distinctively claimed in the concluding portion of the specification. The invention, however, both in structure and operation may be better understood by reference to the following description taken in conjunction with the subjoined claims and the accompanying drawings of which FIG. 1 shows a perspective view of a plate according to the present invention;

FIG. 2 shows an elevation view of the plate illustrated in FIG. 1;

FIG. 3 shows in perspective a cross-section along intersecting lines (x-x) of FIG. 2; two successive single, for horizontally attaching openings separated by a double, for vertically attaching opening are depicted; and FIG. 4 shows in perspective a cross-section along intersecting lines (y-y) of FIG. 2; two successive double, for vertically attaching, openings, between which a single, for horizontally attaching, opening is interposed, are depicted.

IV. DESCRIPTION OF THE PREFERRED EMBODIMENTS

The accompanying drawings, as above described, illustrate a preferred embodiment of a "PLATE HAVING A BACK SIDE ADAPTED TO BE SECURED TO A BASE AND A FRONT SIDE ADAPTED FOR ATTACHING VARIOUS ITEMS". This preferred embodiment is generally designated with numeral A. For convenience, in the following disclosure, the foregoing plate will be named "PLATE A".

As a caveat, it is to be agreed, that terms, such as "front", "back", "vertical", "horizontal", "inward" are conventionally employed in the present specification with reference to a usual position in which "plate A" will be used.

Referring now to FIGS. 1 to 4, in which like numerals indicate like elements, the plate of the present invention already referenced as A includes a basically flat, plastic molded, rectangular structure defined by its horizontal axis of symmetry (not shown) that is relatively longer than its vertical axis of symmetry (also not shown).

Plate A incorporates several horizontal, parallel rows of openings 100. Each row of horizontal, parallel rows of openings 100 of the several horizontal, parallel rows of openings 100 comprises several single, for horizontally attaching openings 110, alternating with several double, for vertically attaching openings 120.

A single, for horizontally attaching opening 110 has an upper and lower walls 130 and 140, the former and the latter inwardly converging from horizontal edges 150 of the single for horizontally attaching opening 110 towards a back side 160 of plate A.

A flat bar for horizontally attaching 170 centrally connects opposite vertical walls 180 of each single for horizontally attaching opening 110. Flat bar for horizontally attaching 170 extends underneath into a rounded protuberance 180.

A double, for vertically attaching opening 120 incorporates a vertically extending, centrally located apex-shape structure 190 formed by a pair of intersecting walls 200 diverging towards back side 160. Double for vertically attaching opening 120 is horizontally limited by a pair of inwardly converging walls 210. At each side of centrally located apex-shape structure 190 a flat bar for vertically attaching 220, similar to flat bar for horizontally attaching 170, connects opposite vertical walls 230 of double, for vertically attaching opening 120.

Plate A includes top and bottom elongated zones 240, each provided with a plurality of equally spaced beveled openings 250. Laterally, plate A includes a plurality of through-out openings 260 and several indented zones 270 provided with several through-out holes 280. Laterally, plate A is also provided, at each side, with an outwardly projection 290 incorporating a slot 300. The latter comprises an inclined wall 310 inwardly and centrally directed towards horizontal imaginary axis of symmetry.

Alternatively to rectangular configuration, other convenient geometrical configurations could be envisaged for plate A.

Use of Plate A

Flat bar for horizontally attaching 170 of a single, for horizontally attaching opening 110 is adaptable to interact with a tie or a tape (both not shown) inserted from outside around flat bar for horizontally attaching 170 and, then, tied around an item. Usually, use is made of a flexible or semi-rigid tie/tape or a fastening tape consisting of opposing strips of nylon, one strip with a dense arrangement of tiny hooks and the other strip with a dense surface of uncut pile (Velcro®).

One or two flat bars for vertically attaching 220 of a double, vertically attaching opening 120 is/are adaptable to interact with a tie or a tape inserted correspondingly around one or more flat bars for vertically attaching 220 and, then, tied around an item.

Equally spaced beveled openings 250 are adaptable to be used with corresponding countersunk screws (not shown) inserted through for attaching plate A to a base (not shown as well).

The plurality of through-out openings 260 is adaptable to receive screws (not shown) for attaching various items to plate A.

The several through-out holes 280 located in corresponding indented zones 270 are adaptable to receive push pins (not shown) for attaching plate A to a base, while slots 300 are adaptable to connect a cover (not shown) when the latter is used in combination with plate A.

Screws (not shown) intended to fit into through-out openings 260 could be used for attaching various items to plate A.

Push pins (not shown) inserted through-out holes 280 could be used for attaching plate A to a base, while slots 300 are intended to connect a cover (not shown) when the latter is used in combination with plate A.

As required, a detailed embodiment of the present invention is disclosed above; however, it is to be understood that the disclosed embodiment is merely exemplary of the invention which may be embodied in various forms. Therefore, specific structural and functional details disclosed herein are not to be interpreted as limiting, but merely as a basis for the claims and as representative basis for teaching one skilled in the art to variously employ the present invention in virtually any appropriately detailed structure.

The embodiments of the invention in which an exclusive property or privelege is claimed are defined as follows:

1. A plate having a back side adapted to be secured to a base and a front side adapted for attaching various items, incorporating a flat, plastic molded structure provided with several horizontal, parallel rows of openings, each one of said several horizontal, parallel rows of openings comprising several single, for horizontally attaching openings, alternating with several double, for vertically attaching openings; each one of said several single, for horizontally attaching openings, having an upper and a lower wall, said upper and lower walls inwardly converging from horizontal edges of said each one of said single, for horizontally attaching openings, towards said back side of said plate adapted to be secured to said base and said front side adapted for attaching various items;

a flat bar or horizontally attaching, centrally connecting opposite vertical walls of said each one of said several single, for horizontally attaching openings, said flat bar for horizontally attaching extending underneath into a rounded protuberance;

each one of said several double, for vertically attaching openings incorporating a vertically extending, centrally located apex-shape structure formed by a pair of intersecting walls diverging towards said back side; said each one said several double, for vertically attaching openings being horizontally limited by a pair of inwardly converging walls; and a flat bar for vertically attaching, being located at each side of said vertically extending centrally located apex-shape structure, connects opposite vertical walls of said each one of said several double, for vertically attaching openings.

2. A plate having a back side adapted to be secured to a base and a front side adapted for attaching various items, incorporating a flat, plastic molded structure provided with several horizontal, parallel rows of openings, each one of said several horizontal, parallel rows of openings comprising several single, for horizontally attaching openings, alternating with several double, for vertically attaching openings; each one of said several single, for horizontally attaching openings, having an upper and a lower wall, said upper and lower walls inwardly converging from horizontal edges of said each one of said several single, for horizontally attaching opening, towards said back side of said plate adapted to be secured to said base and said front side adapted for attaching various items;

a flat bar for horizontally attaching, centrally connecting opposite vertical walls of said each one of said several single, for horizontally attaching openings, said flat bar for horizontally attaching extending underneath into a rounded protuberance;

each one of said several double, for vertically attaching openings incorporating a vertically extending, centrally located apex-shape structure formed by a pair of intersecting walls diverging towards said back side; said each one said several double, for vertically attaching openings being horizontally limited by a pair of inwardly converging walls; and a flat bar for vertically attaching, being located at each side of said vertically extending centrally located apex-shape structure, connects opposite vertical walls of said each one of said several double, for vertically attaching openings;

said flat, plastic molded structure further including:

a top and a bottom elongated zones provided with a plurality of equally spaced beveled openings;

laterally, a plurality of through-out openings;

several indented zones provided with several through-out holes;

outwardly extending projections, each one of said outwardly extending projections including a slot with an inclined wall inwardly and centrally directed;

said flat bar for horizontally attaching being adaptable to interact with a long, thin, bendable element inserted from outside around said flat bar for horizontally attaching and, then, tied around one of said various items;

at least one said flat bar for vertically attaching of said each one said several double, for vertically attaching openings being adaptable to interact with a long, thin, flexible element inserted correspondingly around said at least one said flat bars for vertically attaching and, then; tied around one of said items;

said plurality of equally spaced beveled openings being adaptable to be used with corresponding countersunk screws, inserted through, for attaching said plate having said back side adapted to be secured to said base and said front side adapted for attaching various items;

said plurality of through-out openings being adaptable to receive screws for attaching said flat, plastic molded structure together with said various items to a base;

said several through-out holes located in said indented zones being adaptable to receive push pins for attaching said flat, plastic molded structure to said base; and said slots are adaptable to connect a cover when the latter is used in combination with said flat, plastic molded structure.

* * * * *